(12) United States Patent
Cornell et al.

(10) Patent No.: US 6,568,524 B1
(45) Date of Patent: May 27, 2003

(54) LOAD FORMER ASSEMBLY

(75) Inventors: Donald R. Cornell, Green Acres, WA (US); Jon P. Drake, Chattaroy, WA (US)

(73) Assignee: Alliance Machine Systems Intenational, LLC, Spokane, WA (US)

( * ) Notice: Subject to any disclaimer, the term of this patent is extended or adjusted under 35 U.S.C. 154(b) by 0 days.

(21) Appl. No.: 09/787,048

(22) PCT Filed: Sep. 14, 1999

(86) PCT No.: PCT/US99/21012

§ 371 (c)(1),
(2), (4) Date: May 29, 2001

(87) PCT Pub. No.: WO00/15524

PCT Pub. Date: Mar. 23, 2000

Related U.S. Application Data

(60) Provisional application No. 60/100,162, filed on Sep. 14, 1998.

(51) Int. Cl.[7] ................................................. B65G 47/24
(52) U.S. Cl. ........................................ 198/416; 198/411
(58) Field of Search ................................. 198/398, 401, 198/411, 412, 413, 416

(56) References Cited

U.S. PATENT DOCUMENTS

| | | | | |
|---|---|---|---|---|
| 3,332,531 A | * | 7/1967 | Chaney | 198/416 |
| 4,930,615 A | * | 6/1990 | Nash | 198/416 X |
| 5,139,388 A | * | 8/1992 | Martin | 414/799 |
| 5,188,211 A | * | 2/1993 | Ringot et al. | 198/411 |
| 5,950,842 A | * | 9/1999 | Baur | 148/416 X |

FOREIGN PATENT DOCUMENTS

| | | | |
|---|---|---|---|
| FR | 2168967 | * | 9/1973 |
| GB | 1492002 | * | 11/1977 |

* cited by examiner

*Primary Examiner*—James R. Bidwell
(74) *Attorney, Agent, or Firm*—Dorsey & Whitney LLP

(57) ABSTRACT

A load former assembly (100) for collecting bundles (103) of materials into tiers (121) of selected patterns and stacking the tiers (121), the load former assembly (100) having a power conveyor (104) and a dual pin assembly (106) for horizontal rotation of successive bundles (103) in a first rotational direction or in an opposing second rotational direction, the dual pin assembly (106) extending first or second pins (140) into the path of the bundles (103). The pins (140) can be extended at selected lateral positions on the power conveyor (104). A single pin assembly (112) having a third pin (140) is disposed for rotating the bundles (103) in a set rotational direction. A positioning assembly (116) positions the rotated bundles (103) at selected lateral positions on the power conveyor (104), and the bundles (103) are collected against a tier gate (120) to form the tier (121) in a selected pattern. A sheet dispenser assembly (310) places slip sheets (335) onto the tiers (121).

26 Claims, 18 Drawing Sheets

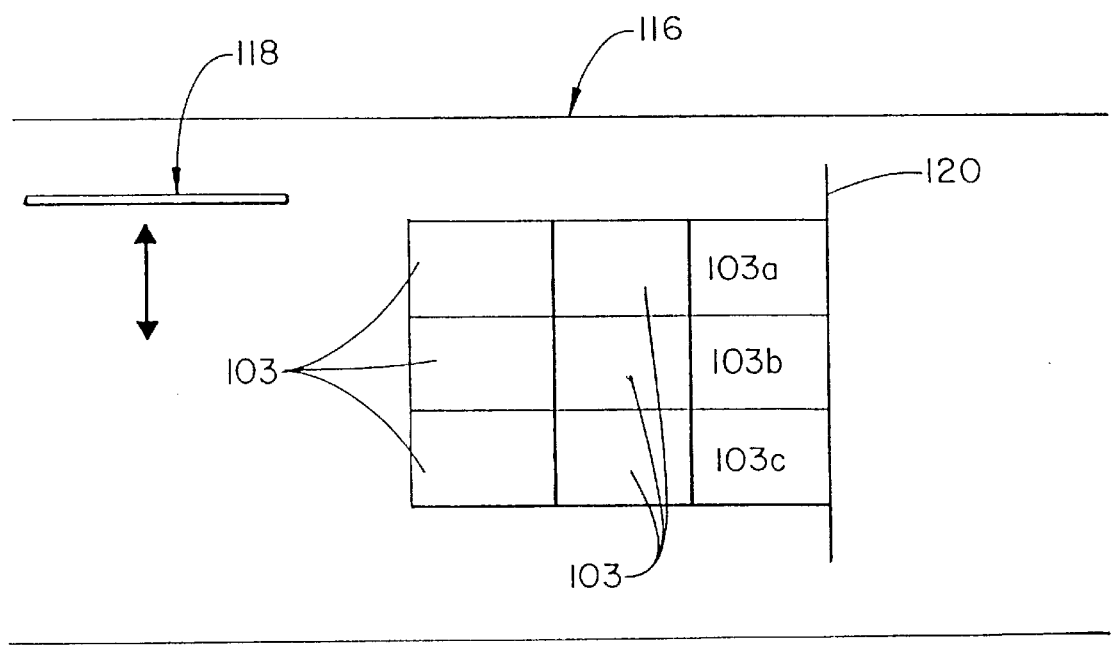
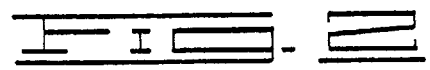
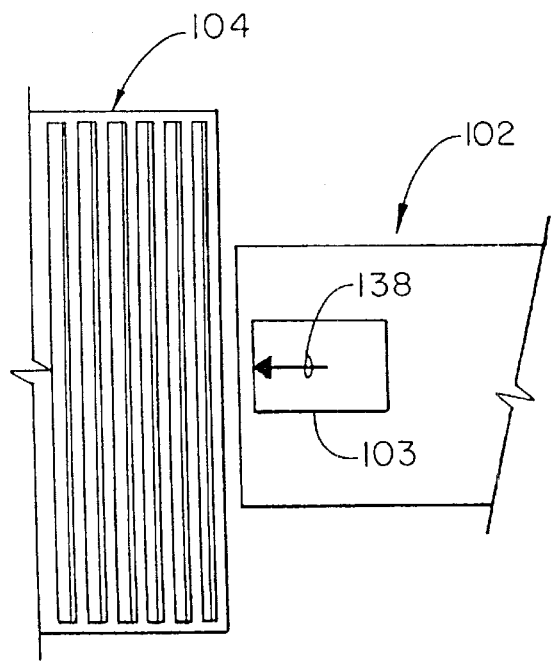
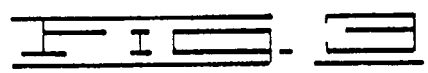

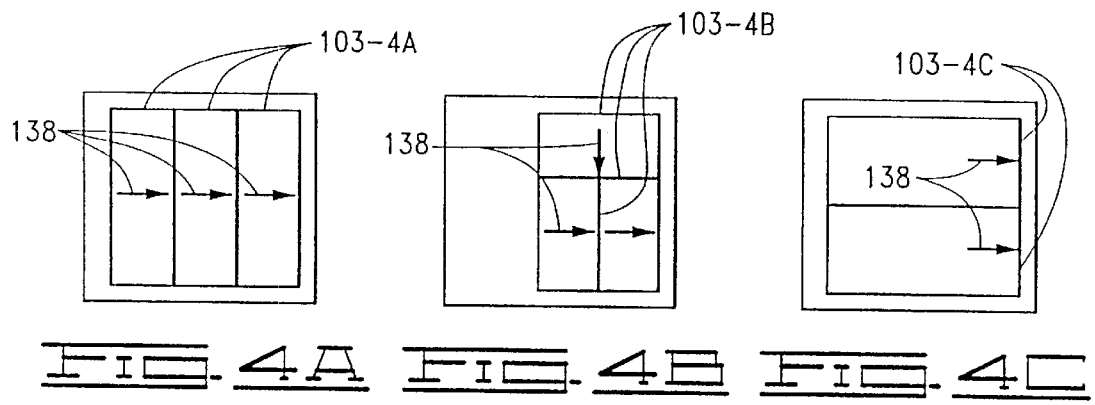
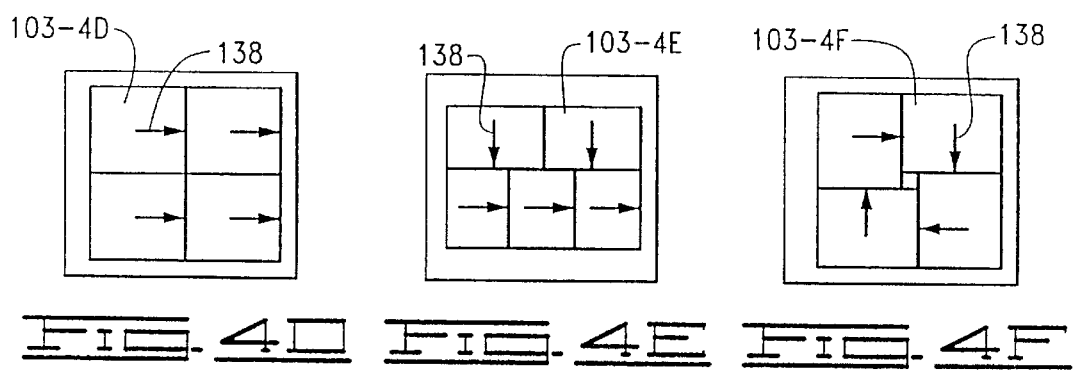
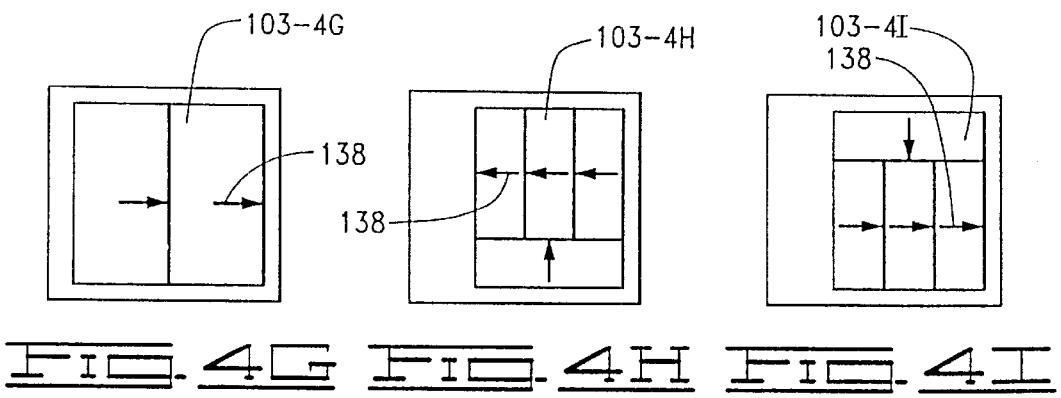

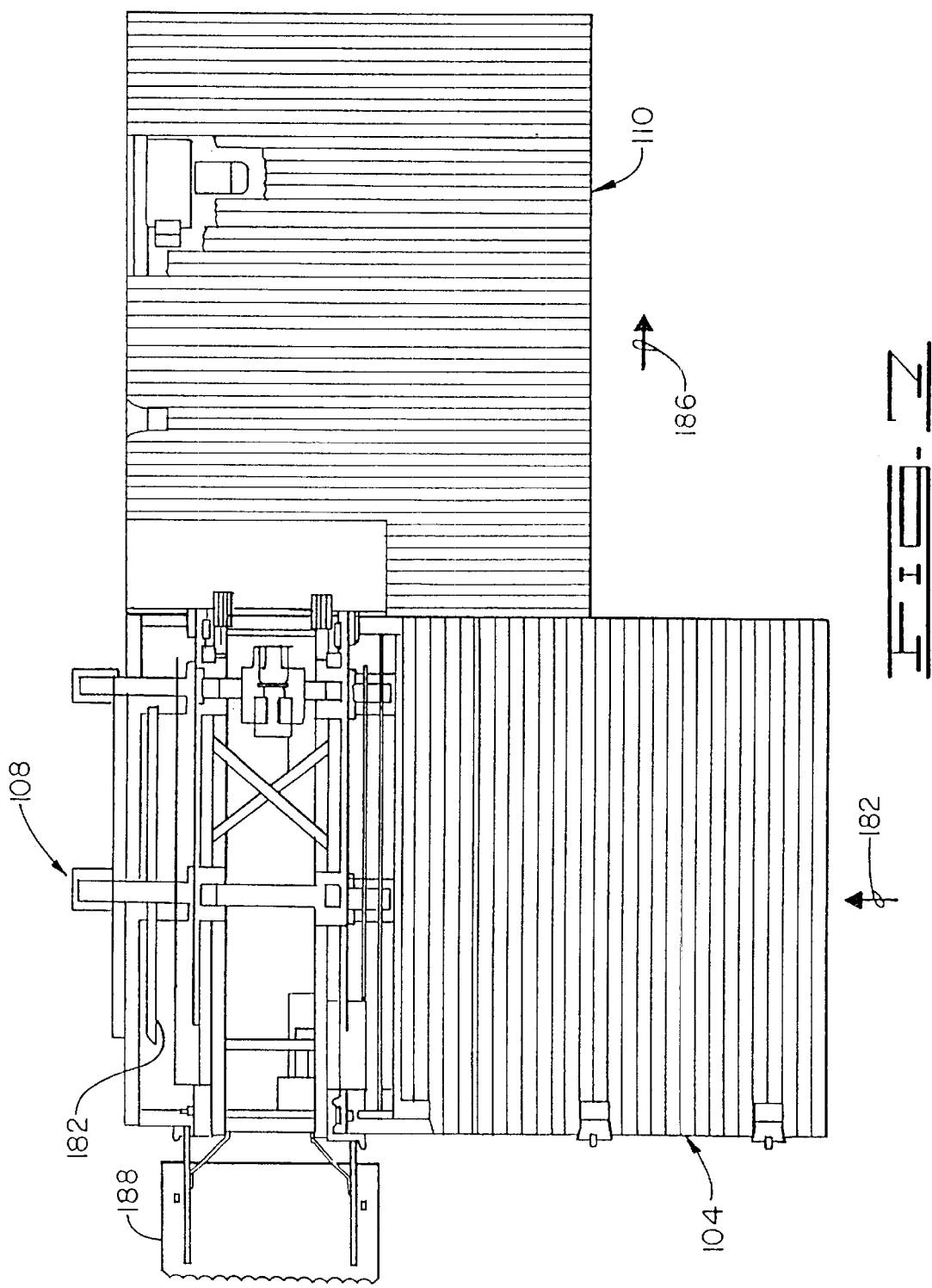

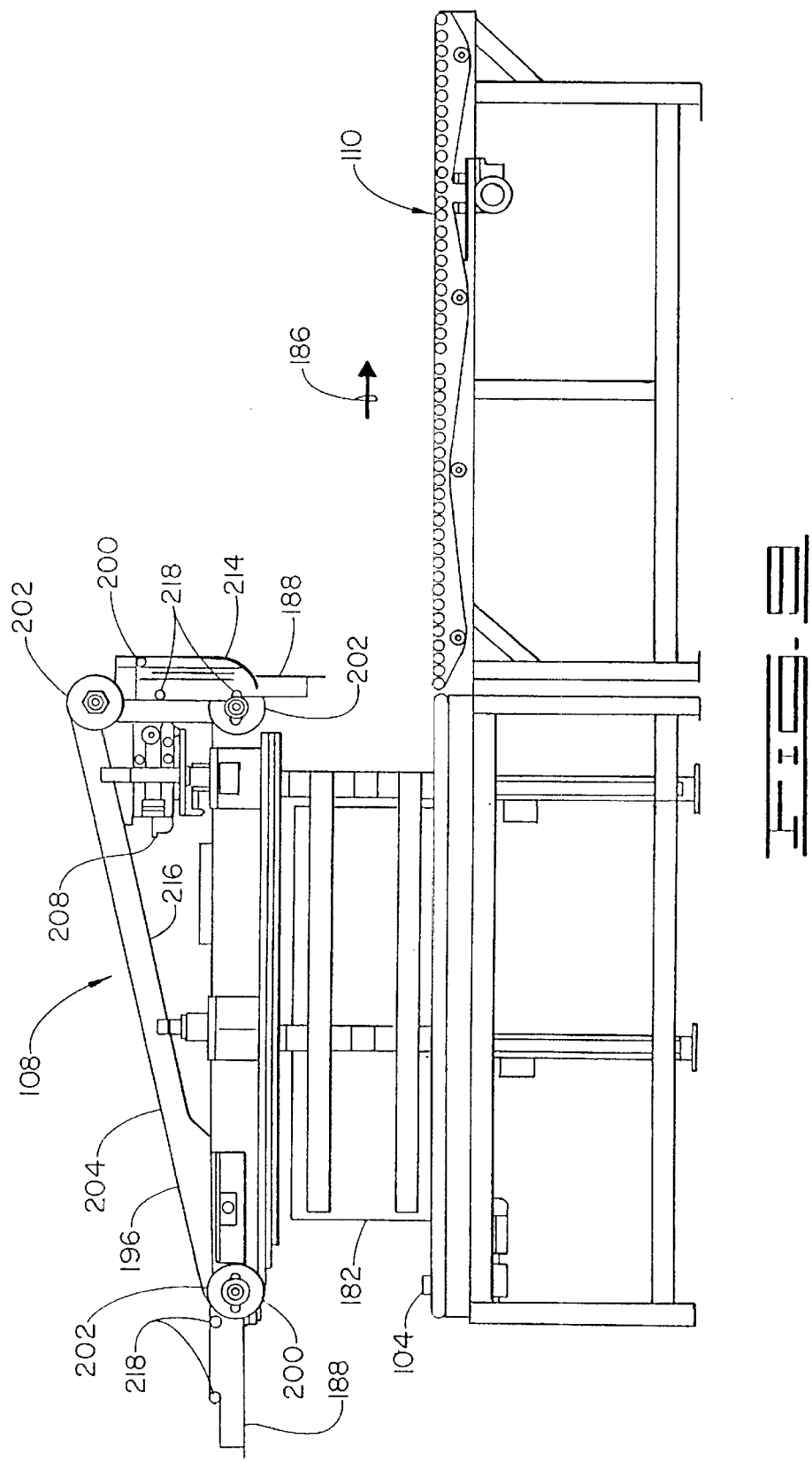

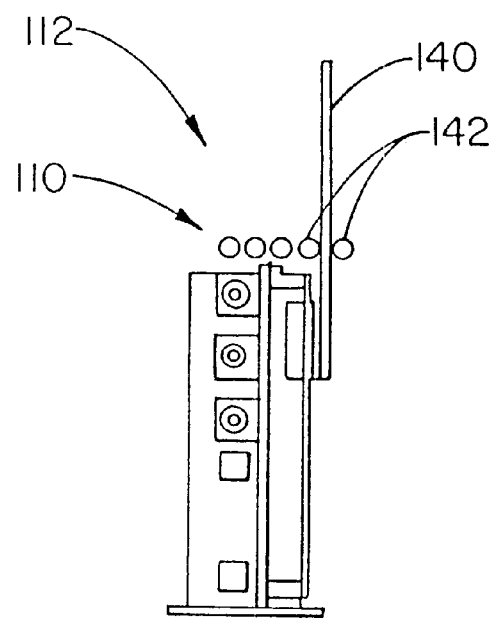
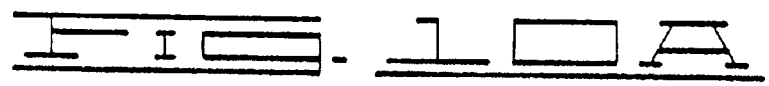
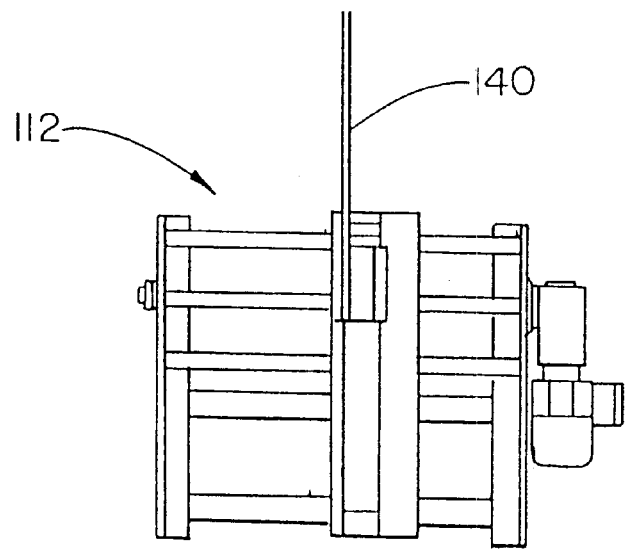
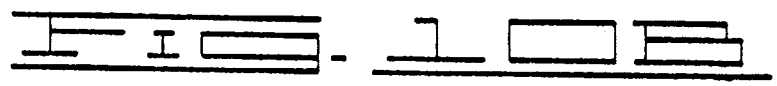

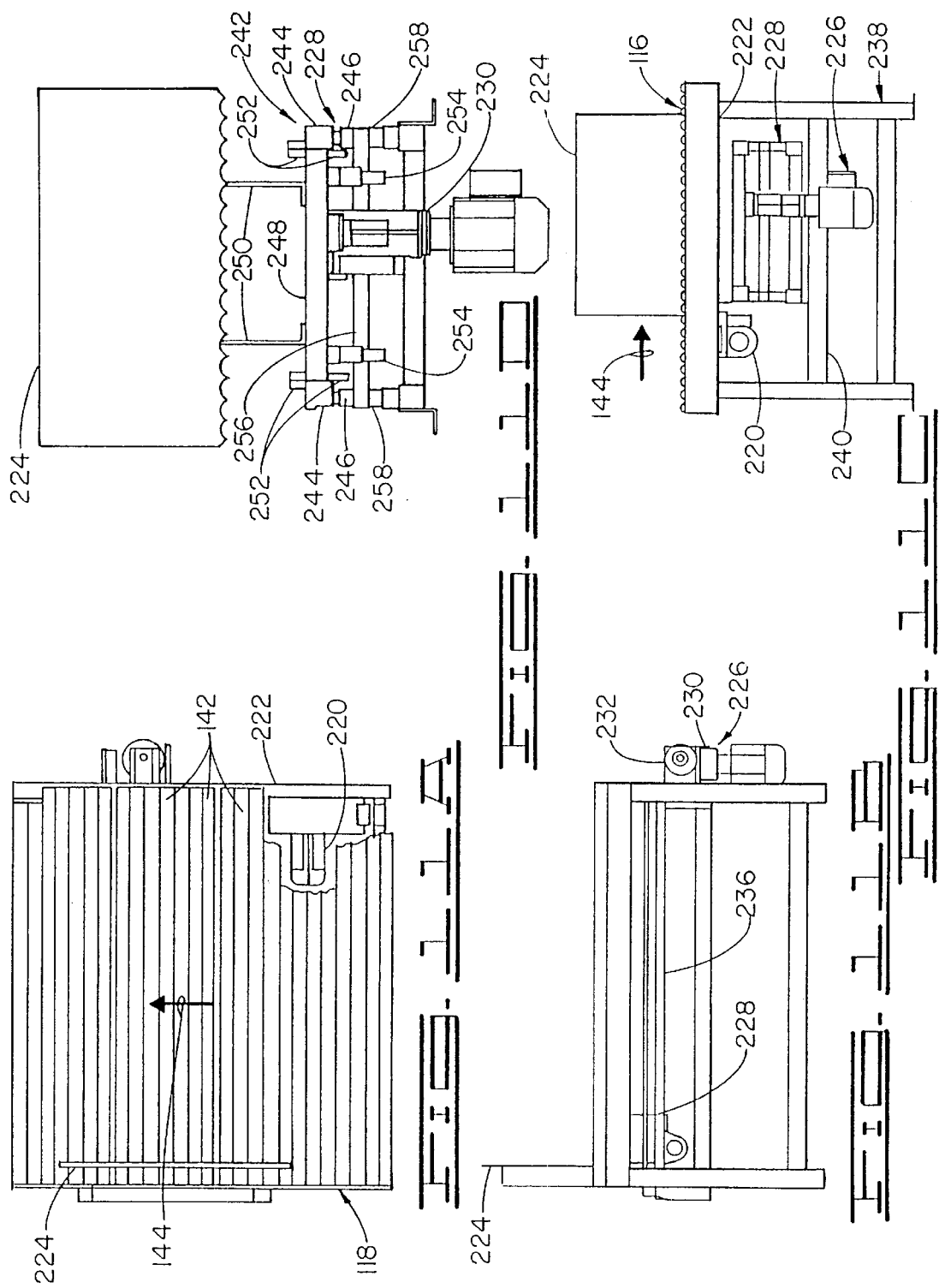

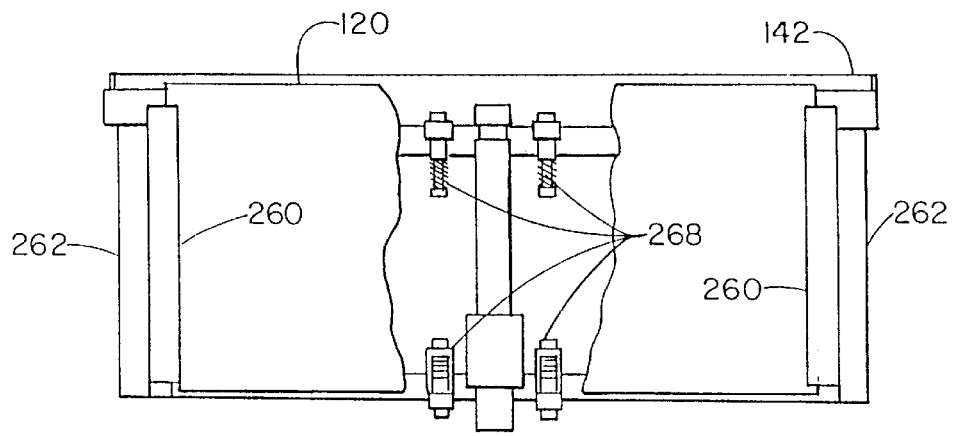
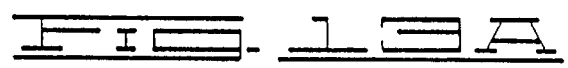
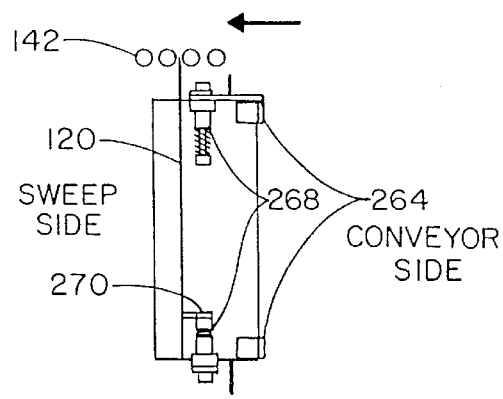
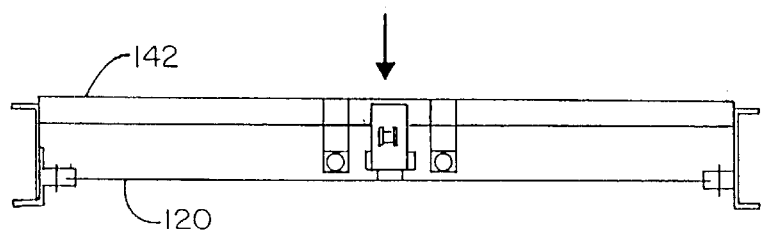
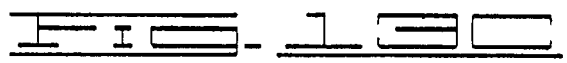

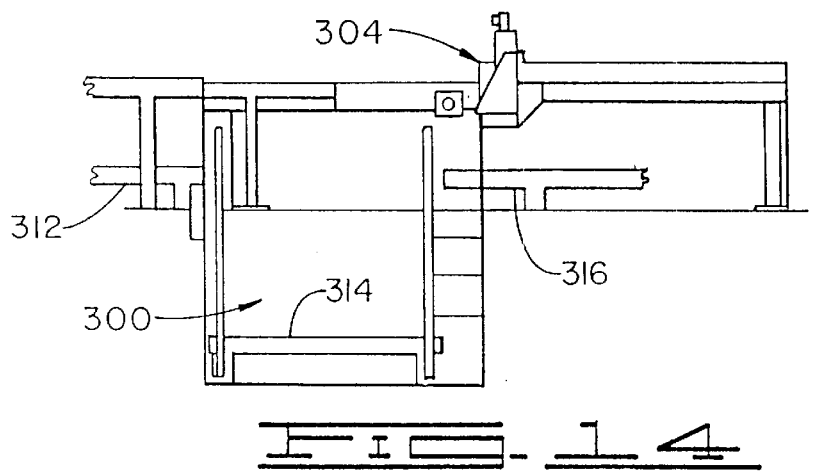
FIG. 14
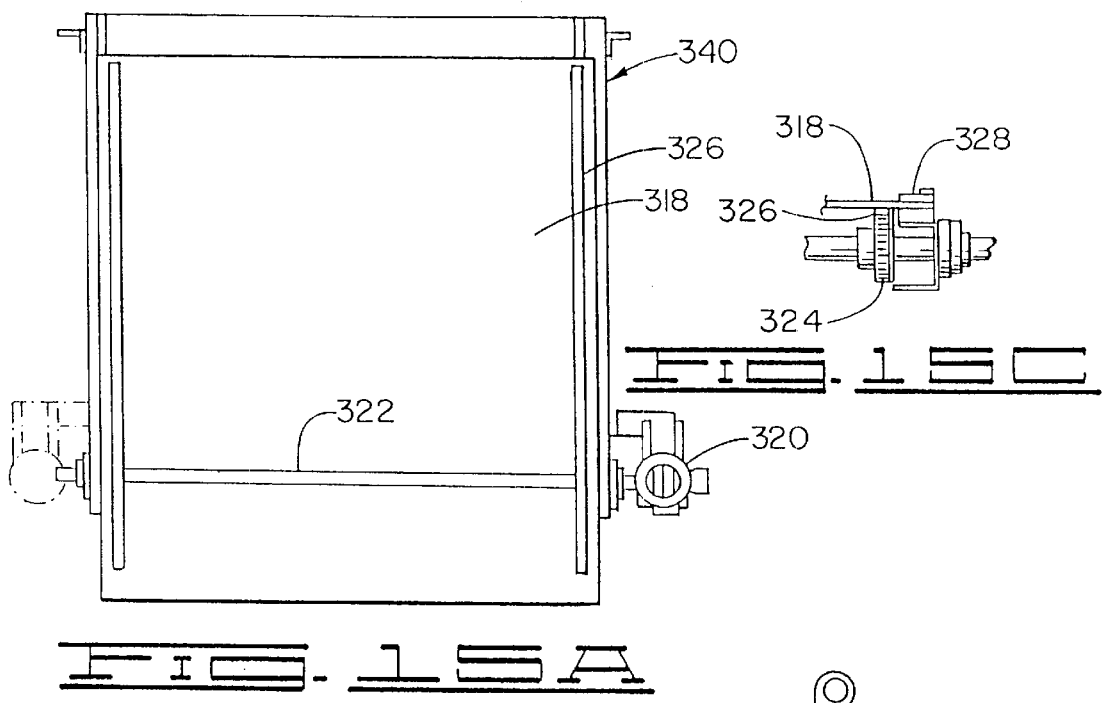
FIG. 15C
FIG. 15A
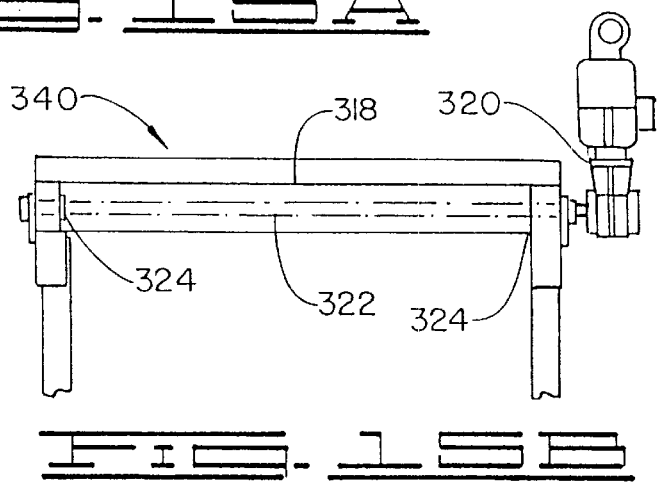
FIG. 15B

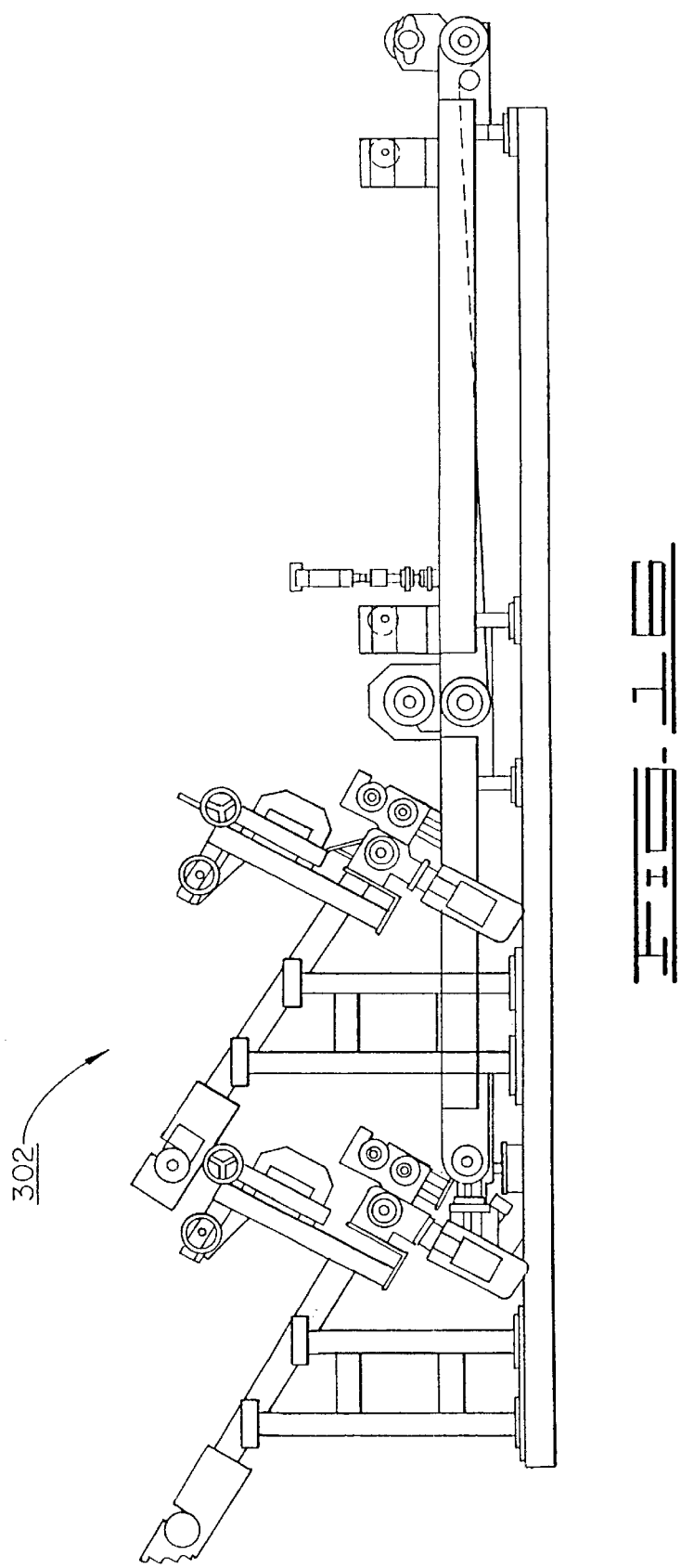

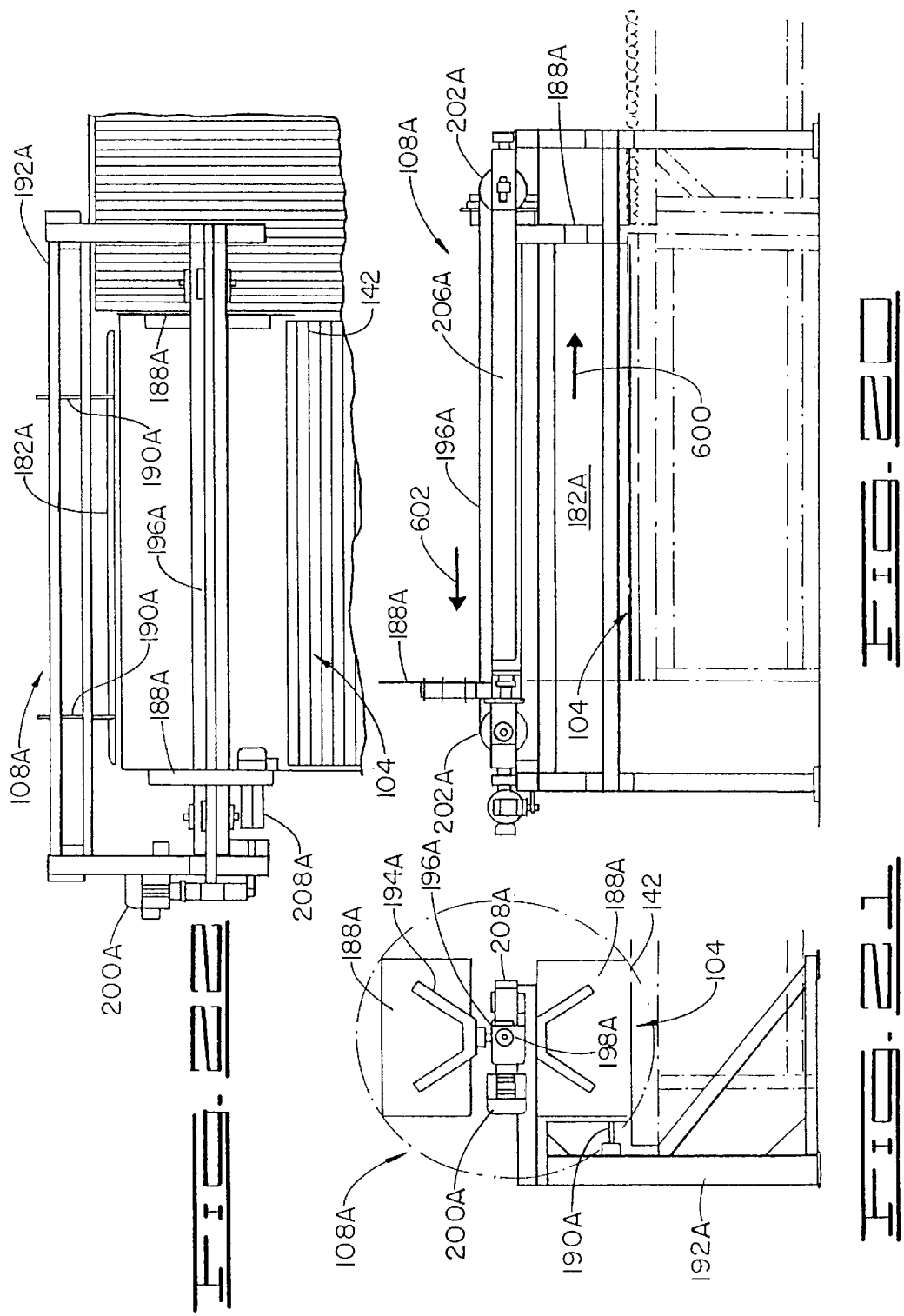

LOAD FORMER ASSEMBLY

This application claims benefit of provisional application No. 60/100,162 filed Sep. 14, 1998.

FIELD OF THE INVENTION

This invention relates generally to the field of material handling, and more particularly but not by way of limitation, to a load form assembly for arranging bundles of materials into tiers and stacking the tiers for transport.

BACKGROUND OF THE INVENTION

Manufacturers of corrugated paper products, such as corrugated boxes, trays and flat corrugated sheets, typically arrange their product in relatively small bundles of the product. The bundles are arranged in layers, or tiers, and the tiers and stacked vertically to form a rather large load of the product for transportation to customers. The load is usually stacked on a pallet and banded together to facilitate handling of the load.

In the past, the load forming process was typically performed by an operator, either completely by a manual procedure or with the assistance of semi-automatic equipment that aids in stacking the tiers. Automation has been applied to the arrangement of individual bundles within a tier with respect to the rotational orientation of each bundle. Such approach is taught by U.S. Pat. No. 5,139,388 issued to Martin. However, the overall process, especially the aspects of rotating bundles into a tier, continues primarily to be a manual labor intensive process. As such, the ability to stack bundles into tiered loads has lagged advances which have automated the shearing and stacking of material into the bundles.

There is a need for an improved approach to the placement of bundled materials into tiers and stacking the tiers into loads. It would be desirable to automatically orient the bundles into selected arrangements of bundles in stacked tiers and to stack the tiers onto pallets suitable for transit.

SUMMARY OF INVENTION

The present invention is for a load former assembly of the type that receives bundles of materials, collects the bundles into tiers of selected patterns and stacks the tiers. The load former assembly has a power conveyor, and a dual pin assembly is disposed near the entry of the power conveyor and serves to rotate successively received bundles horizontally on the power conveyor; rotation can be effected either in a first rotational direction or in an opposing second rotational direction. Depending upon the required rotation of each bundle, the dual pin assembly extends either a first pin or a second pin into the path of the individual bundle so that the bundle is pressed against the pin as the power conveyor conveys the bundle past the pin. Cylinders associated with the first and second pins are energized as required to extend one of the first or second pins into the path of the bundle, and the power conveyor rotates each bundle about the extended pin.

The cylinders associated with the first and second pins are supported for lateral displacement relative to the power conveyor so that the pins can be extended at selected lateral positions on the power conveyor, thereby accommodating for different sizes of bundle materials.

A single pin assembly having a single third pin is disposed downstream to the dual pin assembly for rotating the bundles in a rotational direction as may be required to achieve the completed rotation of the bundles. Past the single pin assembly is a positioning assembly which has a pusher plate that serves to move the rotated bundles to selected lateral positions on the power conveyor. Once past the positioning assembly station, the bundles are collected against a tier gate to form a tier of bundles, the tier having the bundles in a selected pattern achieved by the aforementioned bundle rotation.

The bundle tiers are stacked onto a pallet or the like, and a sheet dispenser assembly places slip sheets as required onto the tiers as the tiers are stacked vertically.

A computerized control system controls the components of the load former assembly so that the bundles are collected at the tier gate in the selected bundle pattern, and the tiers are appropriately stacked.

The objects, advantages and features of the present invention will be apparent from the following description when read in conjunction with the accompanying drawings.

BRIEF DESCRIPTION OF THE DRAWINGS

FIG. 2 is a diagrammatical view illustrating the manner in which bundles are grouped by the load former assembly of FIG. 1 against a tier gate to form a tier.

FIG. 3 shows the reference orientation of a bundle discharged from a slitter and stacker assembly.

FIGS. 4A through 4I illustrate a number of exemplary tiers having various desired rotational arrangements of bundles.

FIG. 7 is a plan view of the first pusher assembly of FIG. 2.

FIG. 9 is an elevational view of the first pusher assembly of FIG. 7.

FIG. 10A is a side view of the transfer conveyor and single pin assembly of the load former assembly of FIG. 1. FIG. 10B is an elevational view of the single pin assembly of FIG. 10A.

FIG. 11A is a plan view of the positioning conveyor and positioner the load former assembly of FIG. 1. FIG. 11B is an end view and FIG. 11C is a side view of the positioner of FIG. 11A. FIG. 11D is a detail view of a portion of the end view of the load former assembly of FIG. 1.

FIG. 13A is a partially broken elevational view of the tier gate of the load former assembly of FIG. 1. FIGS. 13B, 13C are side and top views of the tier gate of FIG. 13A, respectively, FIG. 14 is an elevational view of the elevator and stripper plate assembly of the load former assembly of FIG. 1.

FIG. 15A is a plan view of the stripper plate assembly of the load former assembly of FIG. 1. FIG. 15B, is an end view of the stripper plate assembly of FIG. 15A, and FIG. 15C is a detail portion thereof.

FIG. 16 is an elevational view of the embossing conveyor of the load former assembly of FIG. 1.

FIG. 20 is an end view of another embodiment of a pusher assembly for of the load former assembly of FIG. 1.

FIG. 21 is a side view of the pusher assembly of FIG. 20.

FIG. 22 is a top plan view of the pusher assembly of FIG. 20.

DESCRIPTION

Described herein is an load former assembly having the capability to automatically receive and arrange bundles of sheet materials in closely fitting squares or rectangular layers, commonly called tiers. Each bundle can be selectively rotated being added to a tier to provide a required bundle arrangement in the tier. The tiers are vertically stacked to provide substantially cubical loads of bundles in a characteristic manner suitable for transport.

Figure 1:
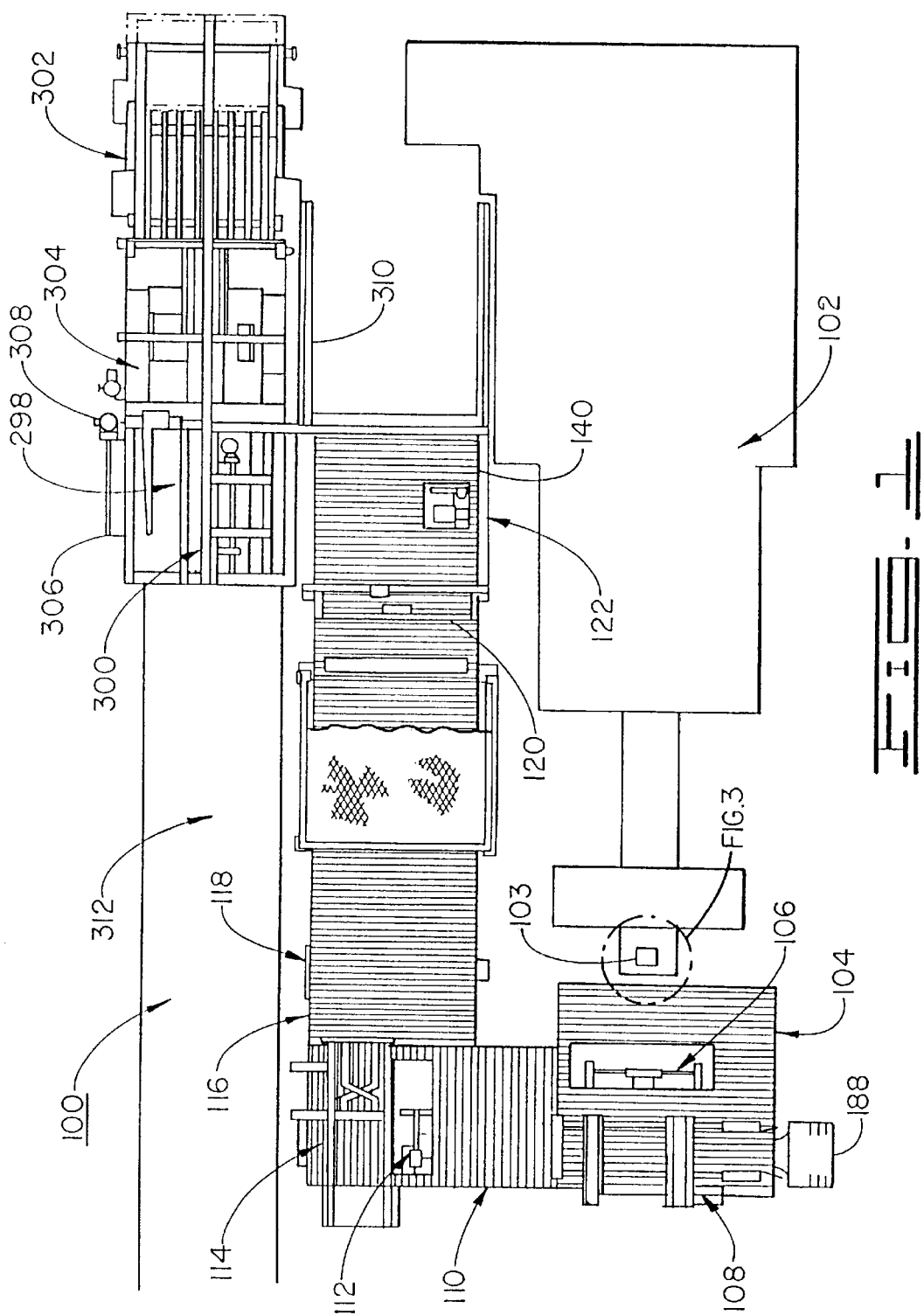
FIG. 1 is a plan view of a load former assembly constructed in accordance with the present invention.

Referring to FIG. 1, shown therein is a load former assembly 100 constructed in accordance with the present invention. Preliminarily, an overview of the major assemblies of the load former assembly 100 will be provided, followed by a detailed description thereof. It will be understood that many details of the load former assembly 100 will not be required by a person skilled in the art in order to make and use the present invention, and for this reason, many such details will not be included herein.

A conventional slitter and stacker assembly 102, depicted diagrammatically, cuts a strip of sheet material, such as paper or corrugated material, into sheets (also sometimes referred to as blanks) of selected length and width and stacks the sheets into bundles 103 of a desired height. The slitter and stacker assembly 102 is well known and widely used in the art so a detailed explanation thereof is not necessary for an understanding of the present invention. The bundles 103 are delivered to a transfer conveyor 104 (also referred to as a power conveyor) where each bundle 103 encounters a dual pin assembly 106 for selective horizontal rotation. Beyond the dual pin assembly 106 each bundle 103 is conveyed by the transfer conveyor 104 into engagement with a first pusher assembly 108.

The first pusher assembly 108 transfers the bundle 103 to a transfer conveyor 110 where the bundle 103 encounters a single pin assembly 112 for selective horizontal rotation. Beyond the single pin assembly 112 the transfer conveyor 110 conveys the bundle 103 to a second pusher assembly 114 which, in turn, transfers the bundle 103 to a positioning assembly 116. The bundle 103 is thereby delivered to a third pusher assembly 118 which positions the bundle 103 to a selective lateral position on the positioning assembly 116 corresponding to a final lateral position of the bundle 103 in the tier to which the bundle will ultimately be assembled.

The bundle 103 continues along the positioning assembly 116 until travel is briefly stopped by the pressing engagement of a tier gate 120. A tier is formed as a desired number of bundles 103 stack up against the tier gate 120. FIG. 2 illustrates an exemplary tier 121 having three bundles 103 in each lateral row and a total of three rows. The substantially square arrangement of the tier 121 is effected by cooperation of the third pusher assembly 118 which laterally positions each bundle 103, the positioning assembly 116 which longitudinally positions the bundles 103, and the tier gate 120 which temporarily stops the longitudinal movement of the bundles 103.

For example, the manner in which the tier 121 is formed is that the third pusher assembly 118 is actuated to permit the first bundle 103a in the first row to pass by unencumbered, the second bundle 103b is laterally positioned by movement of the third pusher assembly 118 just beyond the first bundle 103a, and the third bundle 103c is laterally positioned by movement of the third pusher assembly 118 just beyond the second bundle 103b. The second and third rows of the bundles 103 in the tier 121 are positioned in like manner to form the substantially square tier 121. After the tier 121 is formed the tier gate 120 is retracted to permit all of the bundles 103 in the tier 121 to be moved as a unit by the positioning assembly 116 onto a sweep section 122.

Turning now to FIG. 3, a discussion will now be given of the manner in which the present invention rotationally orients the bundles 103 to form tiers having selected arrangements of bundles 103. FIG. 3 illustrates one such bundle 103 as having a reference leading edge denoted by arrow 138 as the bundle 103 leaves the slitter and stacker assembly 102.

FIGS. 4A through 4I illustrate a number of exemplary arrangements of bundles of various rectangular shapes and sizes that may be desired in a tier. For convenience, the bundles are designated such as 103-4A in FIG. 4A through 103-4I in FIG. 4I. The arrows 138 on each of the bundles in FIGS. 4A through 4I illustrate the relative rotation of the leading edge of each bundle during travel between the slitter and stacker assembly 102 and the tier gate 120.

One skilled in the art will recognize the benefit of varying the bundle arrangement in adjacent tiers in a load. For instance, if the bundles 103-4H are oriented as in FIG. 4H in a given tier, an adjacent tier (above or below) can be oriented as in FIG. 4I so that spaces between bundles 103-4H and bundles 103-4I are vertically discontinuous among adjacent tiers in the load. This lends superior stackability and stability to the load, providing greater resistance to load shifting.

Figure 5A:
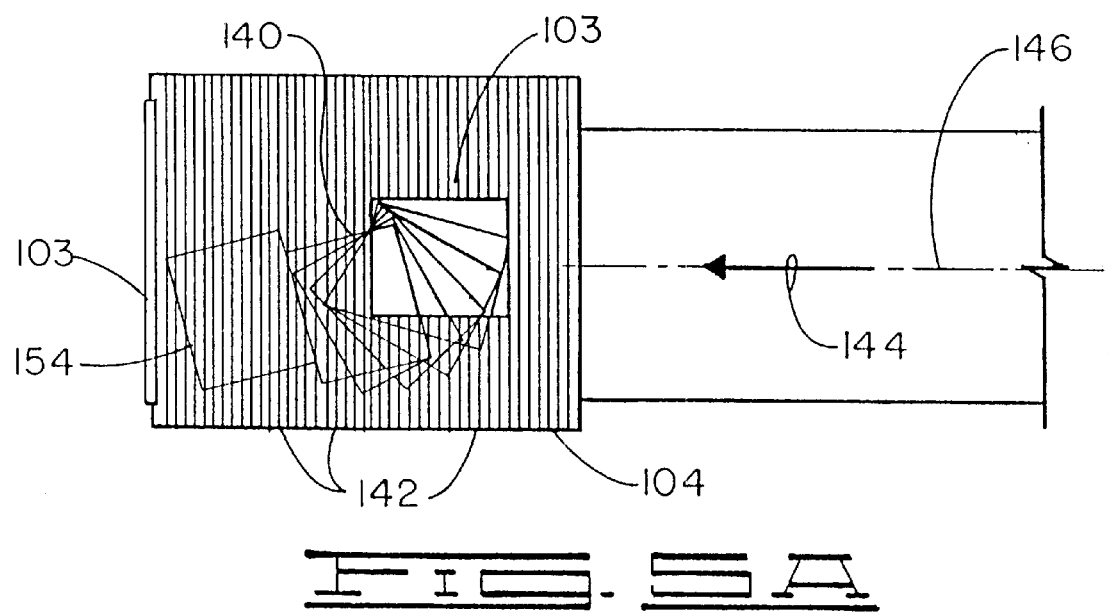
FIG. 5A is a semi-detailed diagrammatical representation depicting a bundle rotating through ninety (90) degrees.
Figure 5B:
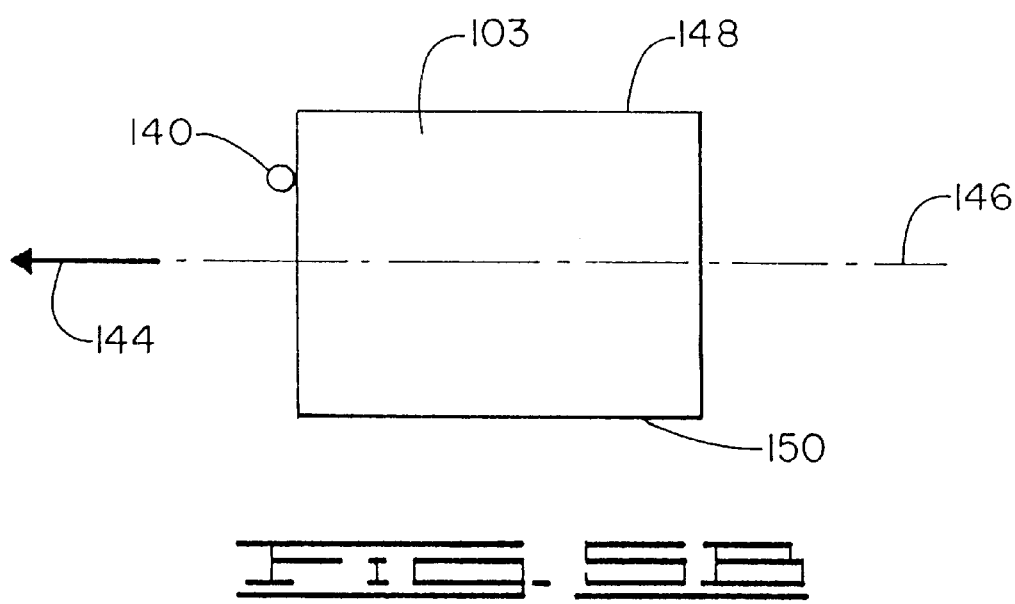
FIG. 5B is an enlarged detail view of the bundle of FIG. 5A.

Rotation of each bundle 103 is provided as necessary by the dual pin assembly 106 and the single pin assembly 112. FIGS. 5A and 5B illustrate the manner in which the bundle 103 is rotated, wherein a pin 140 is positioned so as to extend upwardly between adjacent rollers 142 of a powered conveyor section. It will be understood that both the transfer conveyor 104 and the transfer conveyor 110 are powered roller conveyors of conventional construction so the rollers 142 convey the bundle 103 in a direction indicated by the arrow 144. The transfer conveyor 110 is substantially identical in construction detail to that of the transfer conveyor 104, except as otherwise noted herein below.

To rotate the bundle 103 in a clockwise direction, as illustrated in FIG. 5A, the pin 140 is positioned between a lateral centerline 146 and a side edge 148 of the bundle 103. In this manner, cooperation of the pin 140 and the transfer conveyor 104 alters the conveyed motion of the bundle 103 so as to impart rotation to the bundle 103 in a clockwise direction about the pin 140. Alternatively, for counterclockwise rotation, the pin 140 is positioned between the centerline 146 and an opposing edge 150. Further, if the bundle 103 is to be passed without being rotated, the pin 140 is retracted below the rollers 142 so that the bundle 103 passes by unencumbered.

Rotation of the bundle 103 about the pin 140 will be somewhat less than a full 90 degree turn. Following rotation about the pin 140, the bundle 103 is conveyed into pressing engagement against the backstop of the first pusher assembly 108 (or the backstop of the second pusher assembly 114), described herein below, the result of which is the squaring of the rotated bundle 103 relative to the downstream conveyor 110 (or to the downstream conveyor 116).

The stacking integrity of the sheets or blanks that comprise the bundle 103 can vary greatly depending on the slickness of the surfaces, and it is not uncommon for the bundles to be received by the load former assembly 100 from the slitter and stacker assembly 102 with somewhat tilting edges. As each bundle 103 is caused to be rotated by the cooperative action of the retractable pins 140 and the powered conveyors 104 (or the powered conveyor 110), the integrity of the bundle 103 is improved as the bundle 103 is caused to be squared against the respective backstops of the first or second pusher assemblies 108, 114.

Figure 6A:
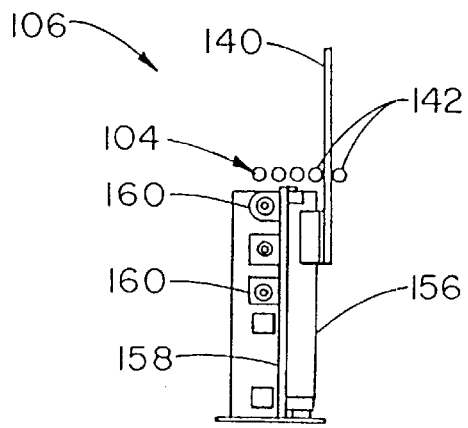
FIG. 6A is a side view of a portion of the transfer conveyor and the dual pin assembly of the load former assembly of FIG. 1.

Turning now to FIG. 6A, shown therein is the dual pin assembly 106 mounted below the rollers 142 of the transfer conveyor 104. The pin 140 is shown in an extended position by the extension of a cylinder 156. In the extended position shown, the pin 140 engages, or abutted by, the passing bundle 103 to effect rotation thereto as previously discussed. Retraction of the cylinder 156 retracts the pin 140 below the transfer conveyor 140 to clearingly disengage the bundle 103.

Figure 6B:
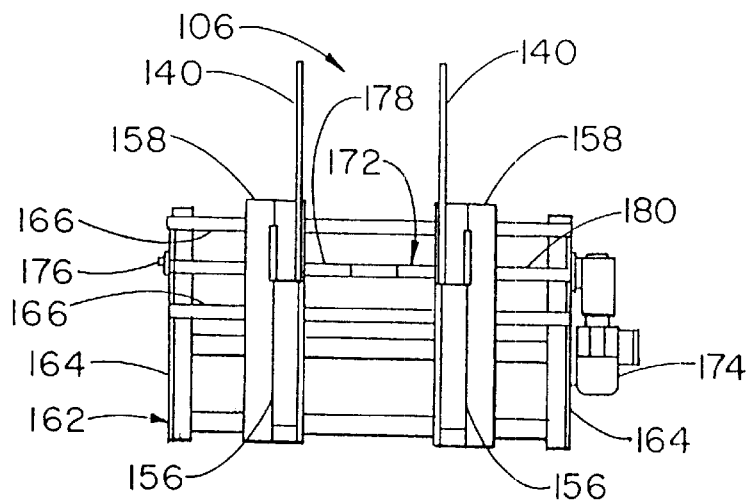
FIG. 6B is an elevational view of the dual pin assembly of FIG. 6A.

FIG. 6B is an elevational view of the dual pin assembly 106 showing two pins 140, each retractably supported by a cylinder 156 so that either or neither of the pins 140 can be extended at any given time. Each cylinder 156 is supported on a cylinder mounting plate 158 which, in turn, supports a pair of pillow block bushings 160 (FIG. 6A). A frame 162 has opposing upstanding members 164 which support a pair of shafts 166 that pass through the bushings 160 so as to slidingly support the mounting plate 158 for lateral movement thereof.

Figure 6C:
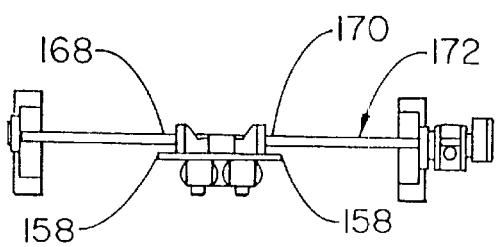
FIG. 6C is a top view of the dual pin assembly of FIG. 6A.

FIGS. 6B and 6C show that one mounting plate 158 supports a right-hand-thread nut 168 and the other mounting plate 158 supports a left-hand-thread nut 170. A drive shaft 172 is rotated at a proximal end by a brakemotor/encoder 174 and supported at a distal end by a bearing 176 in the upstanding member. Medially, the drive shaft 172 threadingly engages the nuts 168, 170. The drive shaft 172 is formed by the end-to-end joinder of a right-hand-thread drive screw 178 and a left-hand-thread drive screw 180. One skilled in the art will recognize that in this manner a rotation of the drive shaft 172 in a first direction will move the pins 140 toward each other, and a rotation in an opposite second direction will move the pins 140 away from each other. The position of the pins 140, as provided by the cooperating brakemotor/encoder 174 and drive shaft 172, is selected so that the pins 140 are positioned relative to the bundle 103 as shown in FIGS. 6A and 6B.

Turning to FIG. 7, shown therein is a portion of the transfer conveyor 104 which conveys the bundle 103 (not shown in this figure), after being rotated by the dual pin assembly 106, into pressing engagement against a stationary backstop 182 of the first pusher assembly 108. The first pusher assembly 108 laterally transfers the bundle 103 from the transfer conveyor 104 to the transfer conveyor 110. The bundle 103 is thereby squared to the transfer conveyors 104, 110 and subsequently swept by a pusher plate 188 laterally off the transfer conveyor 104 and onto the transfer conveyor 110.

Figure 8:
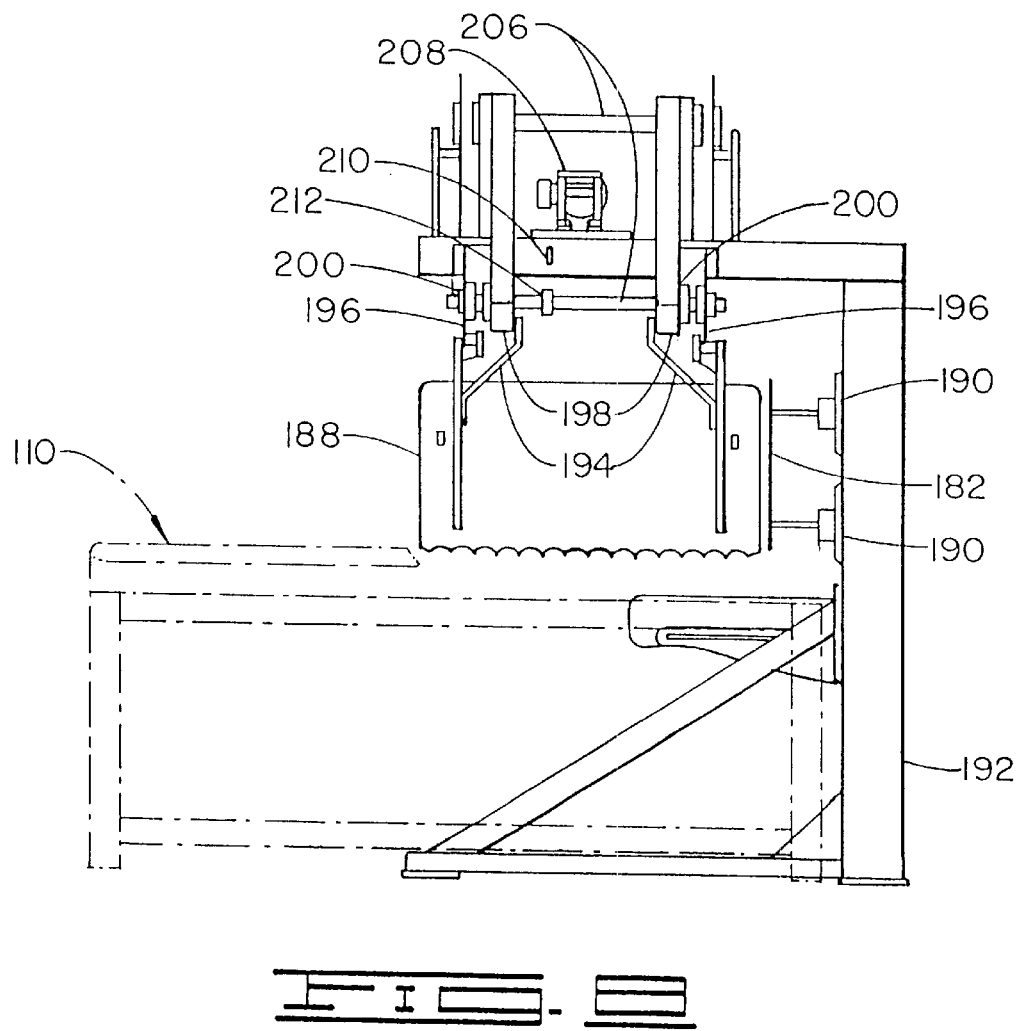
FIG. 8 is an end view of the first pusher assembly of FIG. 7.

FIG. 8 is an end view which shows the backstop 182 to be rigidly mounted to a frame 192 to provide a squaring stop for the bundle 103. In one embodiment, the pusher plate 188 is supported by a pair of flight bars 194 which, in turn, are supported by endless chains 196 and rails 198 for a general sweeping movement across the transfer conveyor 104. A cam follower 200 is supported at a distal end of the flight bar 194 which rollingly engages the rail 198. It will be noted that in a preferred embodiment the pusher plate 188 has a serrated lower edge to match the profile of the rollers 142 in the transfer conveyor 104 so that a portion of the pusher plate 188 extends between the rollers 142 in order to effectively sweep a bottom sheet along with the rest of the bundle 103.

FIG. 9 is an elevational view of the first pusher assembly 108 showing a pair of the pusher plates 188 mounted apart on the chains 196 (only one shown). Each chain 196 is trained over three sprockets 202 and a chain support rail 204. Opposing sprockets 202 are supported by a common shaft 206 (FIG. 8), one of the shafts 206 being powered by a motor 208 driving a drive chain 210 that is trained over a drive sprocket 212 supported by the shaft 206. In this manner it will be understood that the motor 208 imparts continuous rotation to the continuous chains 196 which, in turn, continually rotate the pusher plates 188 in a substantially triangular path.

Along the bottom horizontal leg of this triangular path the pusher plate 188 is supported in a substantially vertical attitude in order to sweep the bundle 103 off the transfer conveyor 104 and onto the transfer conveyor 110. At the end of this horizontal run the cam follower 200 engages an end guide track 214 to support the pusher plate 188 during the first portion of the return trip of the pusher plate 188. A flight roller support rail 216 supports a pair of cam followers 218 as the pusher plate 188 continues along a slanted leg of the chain 196 path.

After being transferred to the transfer conveyor 110, the bundle 103 is conveyed thereby into engagement with the single pin assembly 112. FIG. 10A shows a side view of the single pin assembly 112 which is disposed below the transfer conveyor 110 for protraction of the pin 140 upward between two adjacent rollers 142. The single pin assembly 112 is of substantially similar construction to that of the dual pin assembly 106, and as such a detailed description thereof is not necessary for an understanding of the present invention.

FIG. 10B shows a substantive difference in that the single pin assembly 112 has a single pin 140 and associated mounting hardware. It will be recalled the dual pin assembly 106 has dual pins 140 for the purpose of rotating the bundle 103 in either a clockwise or counterclockwise rotation. The single pin assembly 112, however, engages the bundle 103 after already having been squared against the backstop 182 of the first pusher assembly 108, and it is only necessary to rotate the bundle 103, if at all, in a single rotational direction.

Referring again to FIG. 1, after rotation by the single pin assembly 112, the transfer conveyor 110 conveys the bundle 103 to a second pusher assembly 114. The second pusher assembly 114 is of the same construction as the first pusher assembly 108 and as such a detailed description of the second pusher assembly 114 is not necessary to an understanding of the present invention.

FIG. 11A shows a top view of a sweep plate 224, a part of the third pusher assembly 118, that selectively positions each bundle 103 laterally on the positioning assembly 116. FIGS. 11B and 11C are end and side views, respectively, showing the manner in which a drive assembly 226 laterally positions a carriage assembly 228 which, in turn, supports the sweep plate 224. The drive assembly 226 has a gearmotor 230 and an output drive gear 232 that is coupled to an idler gear 234 by an endless chain 236. The carriage assembly 228 is attached to the chain 236 and is thereby positionably responsive to the gearmotor 230. The gearmotor 230 preferably has an integral encoder by which the position of the sweep plate is determined.

FIG. 11D is a detailed end view showing the manner in which alignment of the sweep plate 224 is maintained while laterally positioning a bundle 103. A frame assembly 238 (FIG. 11C) has intermediate cross members 240 which support a carriage frame 242. The carriage frame 242 includes a pair of opposing guide rails 244, each of which supports a gear rack 246. A mounting plate 248 supports a pair of legs 250 which, in turn, support the sweep plate 224. The mounting plate 248 is attached to the chain 236 for linear displacement along the guide rails 244, and is slidingly disposed thereon by opposing cam rollers 252 attached to the mounting plate 248 and rollingly engaging top and bottom surfaces of the guide rails 244.

To maintain alignment of the mounting plate 248 a pair of pillow block bearings 254 depend from a bottom side thereof and support an alignment shaft 256 in free rotation. At both ends of the alignment shaft 256 are gears 258 which engage the opposing gear racks 246.

Figure 12A:
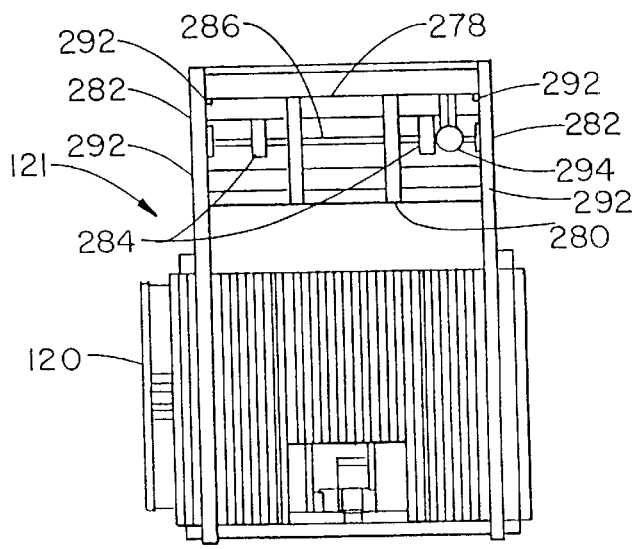
FIG. 12A is a plan view of the sweep section of the load former assembly of FIG. 1.
Figure 12B:
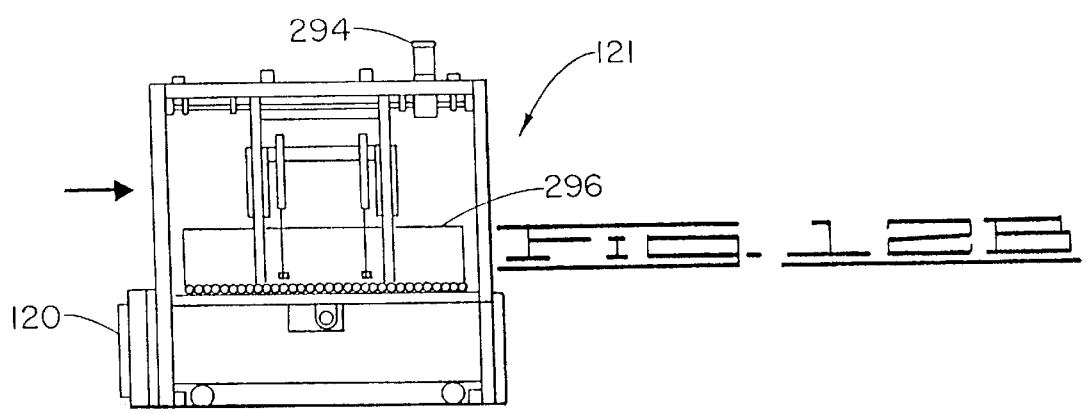
FIGS. 12B, 12C are side and end views of the sweep section of FIG. 12A, respectively.

A discussion of the manner in which the bundles form a tier will now be undertaken. FIG. 12A shows that the tier gate 120 is supported by an inlet portion of the sweep section 122. FIGS. 13A through 13C show in detail the manner in which a pair of opposing guides 260 are attached to frame members 262 of the sweep section 122. Cross beams 264 support opposing hydraulic shock absorbers 268 which limit the vertical movement of a stop 270 (FIG. 13B) that is attached to the tier gate 120. A cylinder 272 is supported by the cross beams 264 and vertically positions the tier gate 120 within the limits of the hydraulic shock absorbers 268.

After the desired number of bundles 103 have stacked up against the tier gate 120 to form a tier, as previously discussed, the tier is conveyed as a unit of bundles 103 into the sweep section 122 when the tier gate 120 is lowered.

Figure 12C:
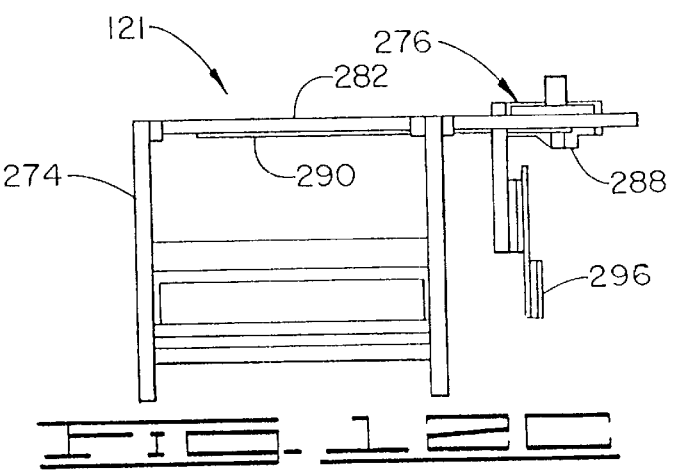

As FIGS. 12A and 12C illustrate, the sweep section 122 has a main frame 274 that supports a carriage assembly 276. The carriage assembly 276 has a frame that includes a pair of parallel supports 278, 280 that generally move within and along a pair of opposing tracks 282. The support 278 has a pair of pillow block bearings 284 depending therefrom, and an alignment shaft 286 supported by the pillow block bearings 284 for free rotation. A pair of gears 288 (one shown in FIG. 12C) are supported by the alignment shaft 286 for engagement with a pair of gear racks 290 (as shown in FIG. 12C), each supported by one of the tracks 282.

The supports 278, 280 each support cam followers 292 which rollingly grip a top surface and a bottom surface of each track 282, and in this manner support the carriage assembly 276 in sliding engagement. A gearmotor 294 is coupled to the alignment shaft 286 and imparts rotation thereto in order to drive the gears 288 against the gear racks 290, thus moving the carriage assembly 276. A sweep plate 296 is supported by the support 280 and is thereby driven laterally across the sweep section 122 to transfer a tier of bundles 103 onto a load assembly 298.

Referring to FIG. 1, the load assembly 298 stacks a selected number of tiers to form a substantially cubical load. The tiers can be banded together once stacked on a pallet to impart structural integrity to the load for transit purposes. A relatively thick sheet of corrugated material, commonly called a cap sheet, can be positioned under the load and over the top of the load to prevent damage to the tiered product. Slip sheets of relatively thin sheets of corrugated or paper can be placed between tiers to enhance stackability therebetween.

As shown in FIGS. 1 and 14, a preferred embodiment the load assembly 298 has an elevator 300 which raises a platform to an elevation suitable for receiving the first tier of a load. A pallet can be placed on the platform as desired to build a load thereon. A bottom cap sheet can be delivered by an embosser conveyor 302. A stripper plate assembly 304 extends a smooth plate above the elevator to facilitate the sweeping action of moving the tier onto a load. A backstop 306 is positioned by a gearmotor 308 to oppose the sweep plate 296 in positioning and squaring the tier on the stripper plate.

After the tier is thus positioned and gripped by the sweep plate 296 and the backstop 306, the stripper plate (denoted below) is withdrawn and the tier resultingly comes to rest on the portion of load built up below. A slip sheet can be delivered by a slip sheet dispenser assembly 310. The elevator 300 then repositions the platform to place the top of the load just under the extended stripper plate. Preferably, the elevator 300 is moved upward slightly to pressingly engage a bottom surface of the stripper plate to lend support thereto as the next tier is being swept on. The elevator 300 cooperates with the slip sheet dispenser 310 and the stripper plate assembly 304 to add the desired number of subsequent tiers. A top cap sheet can be added and the load is conveyed away from the load former by an outbound conveyor 312.

FIG. 14 illustrates the elevator 300 having a vertically positionable platform 314. The platform 314 positions the top of the load just below the stripper plate of the stripper plate assembly 304 when a new tier is being added to the load, and just below the embossing conveyor 316 which delivers the cap sheets. When the load is complete, the elevator 300 raises the platform to be flush with the outbound conveyor 312 to facilitate transfer thereto.

FIGS. 15A and 15B show the stripper plate assembly 304 which positions a stripper plate 318 above the elevator 300 to provide a smooth surface on which a tier slides as it is swept off the sweep section 122. A gearmotor 320 is coupled to a shaft 322 which rotatably supports a pair of gears 324. FIG. 15C best shows the stripper plate 318 supports a pair of gear racks 326 (only one shown), each of which matingly engages the gears 324 so that rotational movement of the gears 324 imparts linear movement to the gear rack 326. The stripper plate 318 is linearly supported by a pair of opposed guides 328 (one shown in FIG. 13C). In this manner the gearmotor 320 extends and retracts the stripper plate 318.

The embosser conveyor 302 which delivers the top and bottom cap sheets is shown in FIG. 16. The construction and operation of the embosser conveyor 302 is described in copending provisional application Ser. No. 60/067,525, filed Dec. 4, 1997, entitled Automatic Cap Sheet Insertion Device, now abandoned, and PCT/US98/25761, filed Dec. 3, 1998, entitled Cap Sheet Forming Apparatus, assigned to the assignee of the present invention and incorporated herein by reference. Accordingly, a detailed description thereof need not be provided herein.

Figure 17:
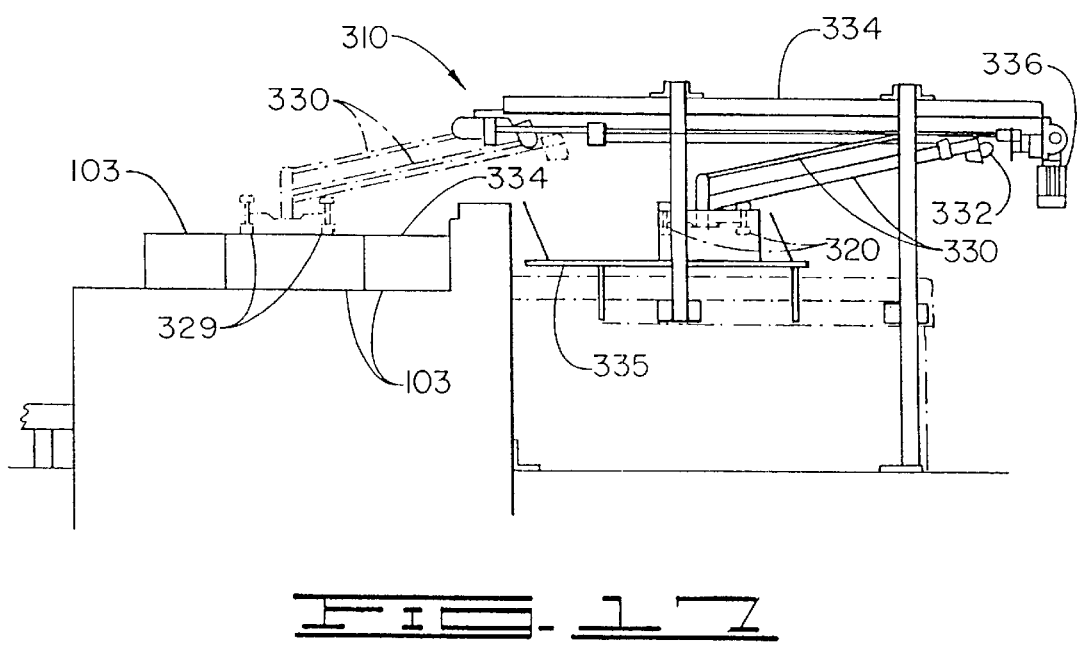
FIG. 17 is an elevational view of the slip sheet feeder of the load former assembly of FIG. 1.

FIG. 17 shows the slip sheet dispenser 310 which has a number of vacuum cups 329 supported at the end of arms 330 pivotally supported by a base 332 that traverses a walking beam 334. The vacuum cups 329 are moved to a "pick" location where slip sheets 335 are picked by lowering the vacuum cups 329 and introducing a vacuum on the vacuum cups 329. The vacuum cups 329 are preferably raised and lowered by an air bag (not shown) supported by the base 332 so that expansion thereof rotates the arms 330 upwardly.

The vacuum cups 329 are moved to a "place" location by a gearmotor 336 which communicates with an endless chain (not shown) to which the base 332 is attached. The place mode is indicated by the broken lines of the arms 330 in FIG. 17. In the place mode the arms 330 are lowered and the vacuum is removed to release the slip sheet 335 on top of a tier.

Figure 18:
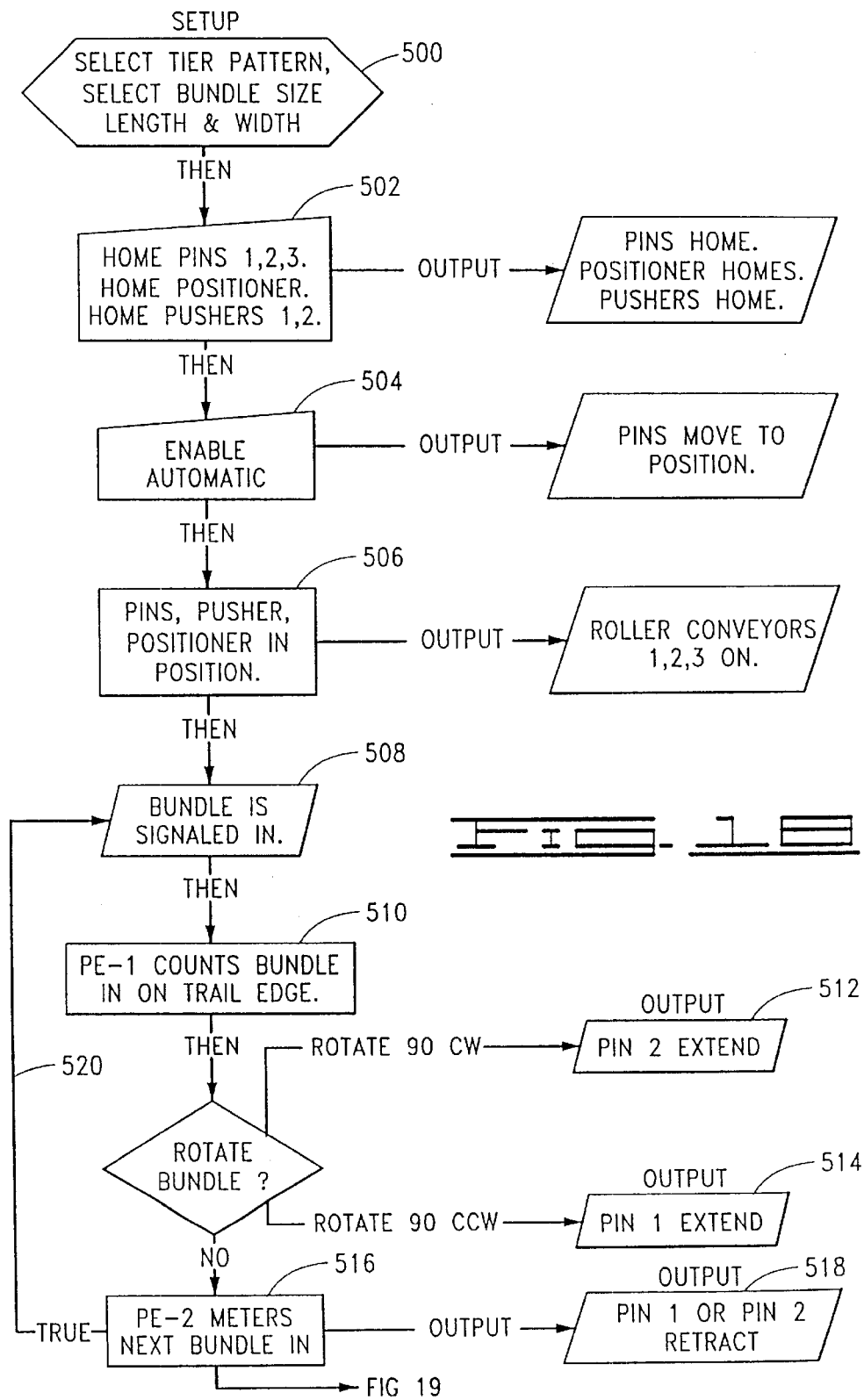
FIG. 18 and FIG. 19 together show a flowchart of the control system of the of the load former assembly of FIG. 1.
Figure 19:
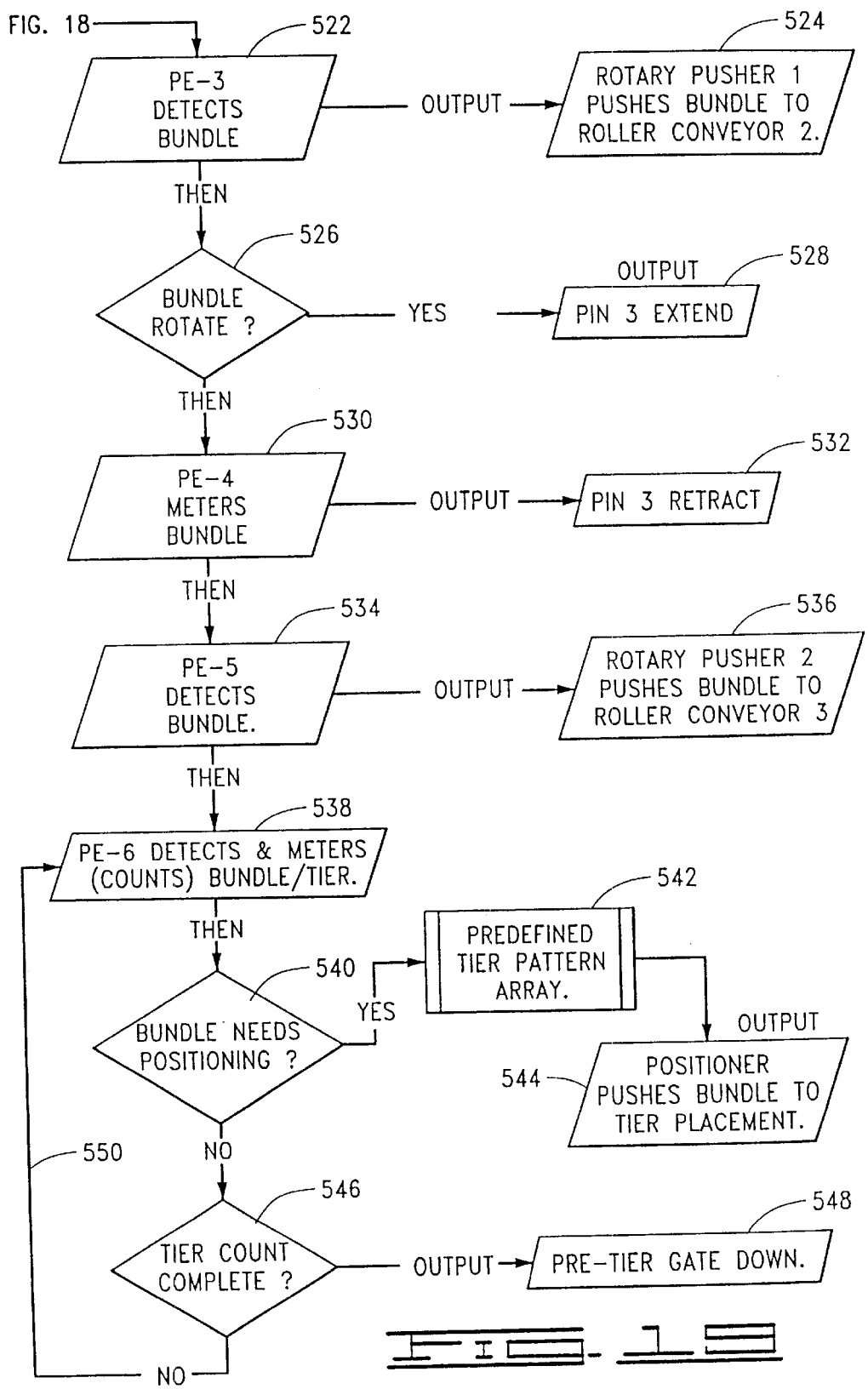

Turning now to FIG. 18 which in conjunction with reference to FIG. 1 provides a flowchart of a portion of the control system of the present invention. A machine operator inputs a selected tier pattern and bundle size (500) and homes the pins 140, the third pusher assembly 118, and the pusher assemblies 108, 114 (502). Given these preliminary setup inputs, the control system which includes a computer (not shown) is then enabled in an automatic mode (504).

In the automatic mode the pins 140, pusher assemblies 108, 114, and the third pusher assembly 118 moves into operable position and the transfer conveyors 104, 110, positioning assembly 116 and sweep section 122 are powered up (506). A bundle is signaled in from the slitter and stacker assembly 102 (508) and a photoeye counts the bundle upstream of the dual pin assembly 106 (510). Both pins are normally retracted below the conveyor. If clockwise rotation is necessary the appropriate pin 140 extends (512), and if counter-clockwise rotation is necessary the other pin 140 extends (514). A photoeye detects the bundle downstream of the dual pin assembly 106 (516) and feedback to the logic signals that the zone is cleared to tell what to do with the pins 140. This control loop is repeated (520) for as long as another bundle is signaled in (508) upstream of the dual pin assembly 106.

A photoeye detects the bundle in the first pusher assembly 108 (522) which pushes it laterally to the transfer conveyor 110 (524). If rotation of the bundle 103 is necessary (526), the single pin assembly 112 is extended (528). A photoeye detects the bundle 103 downstream of the single pin assembly 112 (530) and the pin 140 is retracted (532).

A photoeye detects the bundle 103 in the pusher assembly 114 (534) which pushes it laterally to the positioning assembly 116 (536). A photoeye upstream of the third pusher assembly 118 counts the bundle 103 within the present tier (538) and determines whether the bundle 103 needs lateral positioning (540). If lateral positioning is necessary the third pusher assembly 118 references the predefined selected tier pattern (542) and laterally positions the bundle 103 (544). If the bundle 103 is the last in a tier (546), then the tier gate 120 is lowered (548) so the tier can be conveyed onto the sweep section 122. If another bundle 103 is needed in the tier the control loop is repeated (550) until all bundles 103 are positioned in the tier.

Alternative Pusher Assembly

FIGS. 20 through 22 show another embodiment of a pusher assembly similar to the first pusher assembly 108 but constructed in accordance with the following description.

FIGS. 20 through 22 are views of a pusher assembly 108A which show a backstop 182A to be rigidly mounted via all thread members 190A to a frame 192A to provide a squaring stop for the bundles 103. A pair of spaced apart pusher plates 188A are supported by mounts 194A which, in turn, are supported by linear bearings 196A and linear rails 198A for a sweeping movement across the transfer conveyor 104. It will be noted that the pusher plates 188A have serrated lower edges that are conformed to match with the profile of the rollers 142 in the transfer conveyor 104 so that the lower edges of the pusher plates 188A extend between the rollers 142 in order to effectively sweep the bottom sheet along with the rest of the bundle 103.

FIG. 21 shows that the pair of pusher plates 188A are mounted in spaced apart relationship on the linear rails 198A and are driven by a polychain or belt 196A. The polychain 196A is trained over two sprockets 202A. Opposing sprockets 202A are supported by a common tube 206A, one of the sprockets 202A being powered by a motor 208A driving the polychain 196A. In this manner it will be understood that the motor 208A imparts a forward movement (600) to the lower pusher plate 188A and a return movement (602) to the upper pusher plate 188A. At the end of the stroke, the motor 208A drives the lower pusher plate 188A forward and the upper pusher plate 188A back by means of the common polychain 196A. A motor 200A rotates the tube 206A and pusher plates 188A back one hundred eighty (180) degrees. The cycle is repeated as long as bundles 103 are available to be pushed.

Although the preferred embodiment of the present invention is described herein in terms of a specific combination of transfer conveyors, pushers and pins, one skilled in the art will recognize the spirit of the invention is not so limited. It is clear that the present invention is well adapted to attain the ends and advantages mentioned as well as those inherent therein. While a presently preferred embodiment of the invention has been described for purposes of the disclosure, it will be understood that numerous changes can be made which will readily suggest themselves to those skilled in the art and which are encompassed within the spirit of the invention disclosed.

What is claimed is:

1. A load former assembly for positioning bundles of materials into tiers and stacking the tiers of bundles, the load former comprising:

a power conveyor having a conveying surface for conveying the bundles along a selected path; and a first pin assembly for horizontal rotation of a bundle in a selected of a first rotational direction and in an opposing second rotational direction, the first pin assembly having at least one pin moveable in a direction generally perpendicular to said conveying surface and positionable in the path of the bundle and engaged thereby so that the power conveyor affects said horizontal rotation about the first pin.

2. The load former assembly of claim 1 wherein the first pin assembly comprises:

a cylinder connected to the first pin to extend the first pin into the path of the bundle so that the power conveyor rotates the bundle about the first pin in the first rotational direction.

3. The load former assembly of claim 2 further comprising:

a second pin; and a cylinder connected to the second pin to extend the second pin into the path of the bundle so that the power conveyor rotates the bundle about the second pin in the opposing second rotational direction.

4. The load former assembly of claim 3 wherein the first pin assembly further comprises:

support means for supporting the cylinders and for selectively moving the cylinders laterally to the power conveyor to extend the first or second pins at selected lateral positions on the power conveyor.

5. The load former assembly of claim 4 further comprising:

a second pin assembly for horizontal rotation of the rotated bundle in a set rotational direction downstream to the first pin assembly on the power conveyor.

6. A load former assembly for positioning bundles of materials into tiers and stacking the tiers of bundles, the load former comprising:

a power conveyor for conveying the bundles along a selected path;

a first pin assembly for horizontal rotation of bundle in a selected one of a first rotational direction and in a opposing second rotational direction, the first pin assembly having at least one pin positionable in the path of the bundle and engaged thereby so that the power conveyor effects said horizontal rotation about the first pin, wherein the first pin assembly further comprises a cylinder connected to the first pin to extend the first pin into the path of the bundle so that the power conveyor rotates the bundle about the first pin in the first rotational direction and support means for supporting the cylinders and for selectively moving the cylinders laterally to the power conveyor to extend the first or second pins at selected lateral positions on the power conveyor, a second pin and a cylinder connected to the second pin to extend the second pin into the path of the bundle so that the power conveyor rotates the bundle about the second pin in the opposing second rotational direction; and a second pin assembly for horizontal rotation of the rotated bundle in a set rotational direction downstream to the first pin assembly on the power conveyor, wherein the second pin assembly includes a third pin and a cylinder connected to the third pin to extend the third pin into the path of the bundle so that the power conveyor rotates the bundle about the third pin in the set rotational direction.

7. The load former assembly of claim 6 further comprising:

a positioning assembly for positioning the rotated bundle at a selected lateral position on the power conveyor.

8. The load former assembly of claim 7 further comprising:

a tier gate disposable in the path of the rotated bundle to stop the bundle on the power conveyor for collection of other rotated bundles to form a tier of bundles against the tier gate; and means for retracting the tier gate to permit movement by the power conveyor of the tier of collected bundles together.

9. The load former assembly of claim 8 further comprising:

a tier load assembly for vertically stacking the tier and other tiers onto a pallet or the like.

10. The load former assembly of claim 9 further comprising:

sheet dispenser means for dispensing slip sheets onto the tiers of bundles.

11. The load former assembly of claim 10 further comprising:

control means for controlling the first and second pin assemblies to selective rotate successive bundles, and for controlling the positioning assembly to form the tier of rotated bundles into a selected tier pattern against the tier gate.

12. A load former assembly for positioning bundles of materials into tiers and stacking the tiers of bundles, the load former comprising:

a power conveyor for conveying the bundles along a selected path; and a dual pin assembly for horizontal rotation of successive bundles in a selected one of a first rotational direction and in a opposing second rotational direction, the dual pin assembly having a first pin extendible through the power conveyor and into the path of the bundle and engaged thereby so that the power conveyor effects horizontal rotation about the first pin, and the dual pin assembly having a second pin extendible into the path of the bundle so that the power conveyor effects horizontal rotation about the second pin; and a control system for selecting and controlling the extension of either the first or second pins.

13. The load former assembly of claim 12 wherein the dual pin assembly comprises:

a pair of cylinders connected to the first pin and to the second pin to extend the first pin and the second pin into the path of the bundles so that the power conveyor rotates the bundles about the first pin and second pins in the first rotational direction and the second rotational direction, respectively.

14. The load former assembly of claim 13 wherein the dual pin assembly comprises:

support means for supporting the cylinders and for selectively moving the cylinders laterally to the power conveyor to extend the first or second pins at selected lateral positions on the power conveyor.

15. A load former assembly for positioning bundles of materials into tiers and stacking the tiers of bundles, the load former comprising:

a power conveyor for conveying the bundles along a selected path; and a dual pin assembly for horizontal rotation of successive bundles in a selected one of a first rotational direction and in a opposing second rotational direction, the dual pin assembly having a first pin extendible into the path of the bundle and engaged thereby so that the power conveyor effects horizontal rotation about the first pin, and the dual pin assembly having a second pin extendible into the path of the bundle so that the power conveyor effects horizontal rotation about the second pin, a pair of cylinders connected to the first pin and to the second pin to extend the first pin and the second pin into the path of the bundles so that the power conveyor rotates the bundles about the first pin and second pins in the first rotational direction and the second rotational direction, respectively, and support means for supporting the cylinders and for selectively moving the cylinders laterally to the power conveyor to extend the first or second pins at selected lateral positions on the power conveyor;

a single pin assembly for horizontal rotation of the rotated bundles in a set rotational direction downstream to the dual pin assembly on the poser conveyor.

16. The load former assembly of claim 15 wherein the single pin assembly comprises:

a third pin;

a cylinder connected to the third pin to extend the third pin into the path of the bundles so that the power conveyor rotates the bundle about the third pin in the set rotational direction.

17. The load former assembly of claim 16 further comprising:

a positioning assembly for positioning the rotated bundles at selected lateral positions on the power conveyor.

18. The load former assembly of claim 17 further comprising:
   a tier gate disposable in the path of the rotated bundles to stop the bundles on the power conveyor for collection of the bundles to form a tier of bundles against the tier gate;
   means for retracting the tier gate to permit discharge by the power conveyor of the tier of collected bundles together.

19. The load former assembly of claim 18 further comprising:
   a tier load assembly for vertically stacking the successive tiers onto a pallet or the like.

20. The load former assembly of claim 19 further comprising:
   sheet dispenser means for dispensing slip sheets onto the tiers.

21. The load former assembly of claim 20 further comprising:
   control means for controlling the dual and single pin assemblies to selectively rotate successive bundles, and for controlling the positioning assembly to form the tier of rotated bundles into a selected tier pattern against the tier gate.

22. A load former assembly for receiving and collecting bundles of materials into tiers of bundles having selected patterns, comprising:
   a power conveyor for conveying the bundles along a selected path; and
   a dual pin assembly for horizontal rotation of successive bundles in a selected one of a first rotational direction and in a opposing second rotational direction, the dual pin assembly comprising:
      a first pin extendible into the path of the bundle and engaged thereby so that the power conveyor effects horizontal rotation about the first pin when extended;
      a second pin extendible into the path of the bundle so that the power conveyor effects horizontal rotation about the second pin when extended;
      a pair of cylinders connected to the first pin and to the second pin to extend either the first pin or the second pin into the path of the bundles so that the power conveyor rotates the bundles about the extended first pin or the extended second pin in the first rotational direction and the second rotational direction, respectively; and
      support means for supporting the cylinders and for selectively moving the cylinders laterally to the power conveyor to extend either the first or second pins at a selected lateral position on the power conveyor;
   a single pin assembly disposed downstream to the dual pin assembly for horizontal rotation of the rotated bundles on the power conveyor, the single pin assembly having an extendible third pin and a cylinder connected to the third pin to selectively extend the third pin into the path of the bundle so that the power conveyor rotates the bundle about the third pin in the set rotational direction;
   a positioning assembly disposed downstream to the single pin assembly for positioning the rotated bundles at selected lateral positions on the power conveyor; and
   a control system for controlling dual pin assembly, the single pin assembly and the positioning assembly.

23. The load former assembly of claim 22 further comprising:
   a tier gate disposed downstream to the positioning assembly and disposable in the path of the rotated bundles for collecting the bundles to form a bundle tier against the tier gate; and
   means responsive to the control system for retracting the tier gate to effect discharge by the power conveyor of the tier of collected bundles together.

24. The load former assembly of claim 23 further comprising:
   a tier load assembly for vertically stacking the successive tiers.

25. The load former assembly of claim 24 further comprising:
   sheet dispenser means for dispensing slip sheets onto the tiers.

26. The assembly of claim 1 wherein the at least one pin is movable through the power conveyor.

* * * * *